United States Patent [19]

Marten et al.

[11] Patent Number: 5,017,675

[45] Date of Patent: May 21, 1991

[54] USE OF POLYAMIDOAMINES AS CURING AGENTS FOR EPOXY RESINS AND CURABLE MIXTURES CONTAINING THESE SUBSTANCES WHEREIN THE ACID COMPONENT HAS OXYALKYLENE(REPEATING)UNITS

[75] Inventors: Manfred Marten, Mainz; Claus Godau, Kiedrich; Heinz Schmelzer, Rümmelsheim, all of Fed. Rep. of Germany

[73] Assignee: Hoechst AG, Fed. Rep. of Germany

[21] Appl. No.: 465,467

[22] Filed: Jan. 16, 1990

[30] Foreign Application Priority Data

Jan. 18, 1989 [DE] Fed. Rep. of Germany ....... 3901279

[51] Int. Cl.$^5$ ...................... C08G 59/40; C08G 59/62; C08G 65/00
[52] U.S. Cl. .................................. 528/111; 528/341; 525/504; 523/420
[58] Field of Search ................ 528/111, 341; 525/504; 523/420

[56] References Cited

U.S. PATENT DOCUMENTS 3,257,342  6/1966  Kwong ............................... 528/111

Primary Examiner—Harold D. Anderson
Assistant Examiner—Frederick Krass
Attorney, Agent, or Firm—Bierman and Muserlian

[57] ABSTRACT

Use of polyamidoamines as curing agents for epoxy resins and curable mixtures containing these substances.

The invention relates to the use of polyamidoamines (A) containing primary and/or secondary amino groups as curing agents for epoxy-containing compounds (B), wherein the polyamidoamines (A) used are those compounds which have been obtained by polycondensation of (a) compounds from the group of dicarboxylic acids containing oxyalkylene groups, or derivatives thereof (esters), with (b) polyamines containing at least two amino groups which are condensable with (a).

The invention furthermore relates to curable mixtures containing the abovementioned components (A) and (B). The cured products obtainable according to the invention have advantages with regard to impact strength and shock resistance, to flexibility even at relatively low temperatures and crack-bridging properties.

18 Claims, No Drawings

USE OF POLYAMIDOAMINES AS CURING AGENTS FOR EPOXY RESINS AND CURABLE MIXTURES CONTAINING THESE SUBSTANCES WHEREIN THE ACID COMPONENT HAS OXYALKYLENE(REPEATING)UNITS

Epoxy resins, in particular those which are prepared from bisphenol A and epichlorohydrin, are known raw materials for the preparation of high quality casting resins and coating compositions. The aromatic epoxy resins cured with polyamines have good adhesion to many substrates in addition to good chemical resistance and solvent resistance. Solvent-free processible bisphenol A-epoxy resins with as low a viscosity as possible have considerable importance, inter alia for the protection and stabilization of concrete structures. Curing of the epoxy resins can be carried out using polyamines at ambient temperature.

However, the applicability of epoxy resin/polyamine systems is often limited due to insufficient elasticity or flexibility in the crosslinked state. Permanent bridging of cracks requires coating materials which by virtue of their high elasticity are capable of "flexing" over the crack and at the same time can absorb stresses due to changes in temperature by virtue of high extensibility.

Moreover, the adhesives industry requires flexible epoxy resin systems which have adequate elasticity at low temperatures (for example down to $-30°$ C.).

In principle, the elasticity of epoxy resin systems can be increased externally by the addition of plasticizer or internally by reducing the crosslinked density. However, external elasticizing agents are not reactive and are not incorporated into the thermoset network. External plasticizers which can be used are tar, phthalic esters, high-boiling alcohols, ketone resins, vinyl polymers and other products which do not react with epoxy resins and amine curing agents. However, this type of modification is limited to specific fields of application since it has a number of disadvantages. For instance, these additives cause a pronounced disruption of the thermoset structure, they have a limited plasticizing effect at lower temperatures and they tend to exude under heat stress and with ageing. Elasticity is increased internally by adding compounds which react with the epoxy resins or the curing agents and which participate in crosslinking. In particular, the elasticizing effect is achieved by incorporating long chain aliphatic or highly branched additives to, for example, the curing agent. In practice this allows the elasticity of the epoxy resin systems to be controlled to a certain extent by the use of certain curing agents. For instance, the customary polyamines such as for example ethylenediamine, diethylenetriamine, and triethylenetetramine can be converted into polyamidoamines by reaction with relatively long chain polybasic acids. Although these customary curing agents which have long been widely used have properties which are satisfactory for soft curing agents for epoxy resins, they do not conform to the requirements for a tough and resilient epoxy resin system such as is required for many applications.

The object of the invention is therefore to provide curing agents and also curable mixtures based on epoxy resins and containing these agents, such that the disadvantages of the prior art systems are eliminated or remain only to a reduced extent.

Surprisingly, it has now been found that specific polyamidoamines prepared from oxyalkylene-group-containing dicarboxylic acids or derivatives thereof and polyamines or partially pre-crosslinked adducts of these polyamidoamines with epoxy-containing compounds do not show these disadvantages. Rather, curable compositions made from these curing agents and epoxy-containing compounds (epoxy resins) produce coatings with good adhesion or adhesives, sheetlike structures, sealing compositions, moldings and the like with high impact strength and shock resistance, high elasticity even at low temperatures and good crack-bridging properties.

The invention therefore relates to the use of polyamidoamines (A) containing primary and/or secondary amino groups as curing agents for epoxy-containing compounds (B), wherein the polyamidoamines (A) used are those compounds which have been obtained by polycondensation of (a) compounds from the group of dicarboxylic acids containing oxyalkylene groups, or derivatives thereof, with (b) polyamines containing at least two amino groups which are condensable with (a).

The invention furthermore relates to curable mixtures containing these polyamides (A) and epoxy-containing compounds (B) and optionally also diluents (C) and optionally additives (D).

The polyamidoamines (A) used according to the invention, which preferably have a linear chain structure, contain an average of at least 2, preferably 2 to 4 primary and/or secondary amino groups per molecule, of which at least one amino group is preferably primary. These polyamidoamines preferably contain 2 primary amino groups or 2 primary and 2 secondary amino groups. Basically, it is also possible to use polyamidoamines without primary amino groups, for example those having 2 or more secondary amino groups, but as a rule this variant is less advantageous. Generally, the amine number is between 8 and 900, preferably between 50 and 500, and in particular between 100 and 400 mg of KOH/g, while the acid number is for the most part 0.01 to 10, preferably 0.01 to 3 mg of KOH/g. Furthermore, these polyaminoamides (A) have equivalent weights of active hydrogen which are generally in the range 50 to 3500, preferably 50-500 and in particular 70-300 and also average molecular weights $M_n$ (number average) of from 200 to 15000, preferably from 200 to 2500.

Depending on the type of starting components (a), (b) and the mole ratio between them and on the molecular weight of (A), these polyamidoamines may be low-viscosity to high-viscosity or solid products, which, depending on their application, may be used optionally in an organic solvent or in water.

The preparation of the polyamidoamines (A) is carried out in a manner known per se by reacting the compounds (a) with the polyamines (b), for example by heating the components for several hours with the exclusion of oxygen at temperatures of 125°-250° C., preferably 150°-190° C., initially under atmospheric pressure and then optionally under reduced pressure. See in this connection Sato, Iwabuchi, Böhmer and Kern (Makromol. Chem. 182, pp. 755-762 (1981)), Kern, Kämmerer, Böhmer and Bhagwat (Angewandte Makromolekulare Chemie 113, pp. 53-59 (1983)), Imai, Ogata, Kakimoto (Makromol. Chem., Rapid Commun. 5, 47-51 (1984)) and also DE-A-2,658,714, JP-A-84/1532 and EP-A-332,967. The polyamidoamines described therein can also be used according to the invention as long as they have the properties given above.

The compounds (a) are oxyalkylene-containing, preferably oxyethylene-containing, dicarboxylic acids or derivatives thereof which are reactive with (b) such as anhydrides, halides and particularly esters. These compounds (a) preferably have the formula (I)

$$R^2OOC-CH_2-[-O-R^1-]_nO-CH_2-COOR^2 \quad (I)$$

in which
$R^1$ = a branched or unbranched alkylene radical having 2 to 5, preferably 2 carbon atoms;
$R^2$ = independently of one another, hydrogen or a branched or unbranched alkyl radical having 1 to 6, preferably 1 to 3 carbon atoms;
n = 0 or an integer from 1 to 300, preferably 1 to 50 and in particular 1 to 25.

Examples of compounds (a) are: 3,6-dioxaoctanedicarboxylic acid, 3,6,9-trioxaundecanedicarboxylic acid, polyglycoldicarboxylic acid with a molecular weight of about 400, preferably of about 600, or mixtures of these acids.

The preparation of these compounds (a) is known (cf. for example DE-A-2,936,123) and is carried out for example by oxidation of polyglycols in the presence of catalysts.

The compounds (a) may optionally also contain up to 40%, preferably up to 30%, of an aliphatic, cycloaliphatic or aromatic dicarboxylic acid or mixtures of these acids.

Examples of aliphatic dicarboxylic acids whose aliphatic radical generally contains 1 to 20, preferably 2 to 12 carbon atoms, are succinic acid, glutaric acid, adipic acid, suberic acid, azelaic acid, sebacic acid and dodecanedicarboxylic acid.

Examples of suitable cycloaliphatic carboxylic acids whose cycloaliphatic radical mostly contains 5 to 12, preferably 6 to 8 carbon atoms, are the various cyclohexanedicarboxylic acid isomers, hexahydrophthalic acid and tetrahydrophthalic acid.

Examples of aromatic dicarboxylic acids which can be used are: terephthalic acid, isophthalic acid, o-phthalic acid and various naphthalenedicarboxylic acids, for example 2,6-naphthalenedicarboxylic acid. Particular preference is given to terephthalic acid. Mixtures of the aromatic dicarboxylic acids can also be used.

Other suitable aromatic carboxylic acids are those of the type

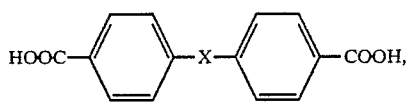

in which X represents a chemical bond, alkylene radicals having 1 to 6 carbon atoms, O or CO.

The polyamines (b), which are reacted with the compounds (a) to form the polyamidoamines (A), have at least two amino groups which are condensable with (a), of which preferably at least one is a primary amine group; particular preference is given to (b) containing 2 primary amino groups. Examples of polyamines (b) which are suitable for this purpose are those of the formula (II)

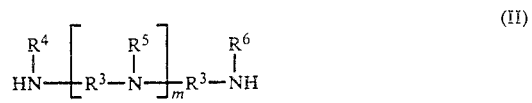

in which
$R^3$ = independently of one another, a divalent hydrocarbon radical having 1 to 20, preferably 2 to 12 carbon atoms, a preferably branched or else unbranched alkylene radical having 1 to 20, preferably 2 to 6 carbon atoms, a cycloalkylene radical having 5 to 12, preferably 6 to 10 carbon atoms or an aralkylene radical having 7 to 12, preferably 8 to 10 carbon atoms;
$R^4$, $R^5$, $R^6$ = independently of one another, hydrogen, a hydrocarbon radical having 1 to 20, preferably 1 to 12 carbon atoms, a preferably branched or else unbranched alkyl radical having 1 to 20, preferably 1 to 6 carbon atoms, a cycloalkylene radical having 5 to 12, preferably 6 to 10 carbon atoms or an aralkylene radical having 7 to 12, preferably 8 to 10 carbon atoms, where these radicals may also be interrupted by heteroatoms or
$R^4$ and $R^5$ = part of a preferably saturated ring system having 3 to 8, preferably 3 and 4 carbon atoms;
m = 0 or an integer from 1 to 8, preferably 0 and 1 to 4.
$R^4$ and/or $R^6$ preferably represent hydrogen.

Examples of polyamines (b) of this type are: ethylenediamine, 1,2-diaminopropane, 1,3-diaminopropane, 1,3-diaminobutane, 1,4-diaminobutane, 1-amino-3-methylaminopropane, 2-methylpentamethylenediamine, pentamethylenediamine, hexamethylenediamine, trimethylhexamethylenediamine, neopentyldiamine, octamethylenediamine, cycloaliphatic diamines such as 1,2-, 1,3- or 1,4-cyclohexanediamine; 4,4'-methylene-bis-cyclohexylamine, isophoronediamine, menthanediamine, 4,4'-diamino-3,3'-dimethyldicyclohexylmethane, 3-aminoethyl-1-(3-aminopropyl-1-methyl)-4-methylcyclohexane, N-methylethylenediamine, N-aminoethylpiperazine, xylylenediamine, tricyclododecyldiamine, N-cyclohexylpropanediamine, methyl-bis-(3-aminopropyl)-amine, ethyl-bis-(3-aminopropyl)-amine, N-(3-aminopropyl)tetramethylenediamine, N,N'-bis-(3-aminopropyl)tetramethylenediamine, polyalkylenepolyamines such as di-(1,2-propylene)triamine, bis(3-aminopropyl)amine, tri-(1,2-propylene)tetramine, diethylenetriamine, triethylenetetramine and tetraethylenepentamine, the commercially available primary aliphatic polyoxypropylenediamines or polyoxypropylenetriamines and also etherdiamines such as for example 1,7-diamino-4-oxaheptane, 1,7-diamino-3,5-dioxaheptane, 1,10-diamino-4,7-dioxadecane, 1,10-diamino-4,7-dioxa-5-methyldecane, 1,11-diamino-4,8-dioxaundecane, 1,11-diamino-4,8-dioxa-5-methylundecane, 1,12-diamino-4,9-dioxadodecane, 1,13-diamino-4,10-dioxatridecane, 1,13-diamino-4,7,10-trioxa-5,8-dimethyltridecane, 1,14-diamino-4,7,10-trioxatetradecane, 1,16-diamino-4,7,10,13-tetraoxahexadecane, 1,20-diamino-4,17-dioxaeicosane. Particular preference is given to b 2-methylpentanediamine, diethylenetriamine, triethylenetetramine, isophoronediamine, m-xylylenediamine and trimethylhexamethylenediamine. Mixtures of these amines can also be used.

The polyamidoamines (A) can, according to one embodiment of the invention, already have been partially reacted (=pre-crosslinked) with epoxy-containing compounds, preferably the same compounds as (B), as a result of which in many cases improved properties are obtained in the cured products. This pre-crosslinking is carried out by reacting with the epoxy-containing compound deficiency, and generally 0.1 to 50%, preferably 5 to 25% of the active hydrogen, in particular of the primary/secondary amino groups, of (A) are brought into reaction.

Suitable epoxy-containing compounds (B) include a large number of compounds known for this property which contain on average more than one epoxy group, preferably 2 epoxy groups per molecule. These epoxy compounds (epoxy resins) may be either saturated or unsaturated and also aliphatic, cycloaliphatic, aromatic or heterocyclic and may also have hydroxyl groups. Moreover, they may contain substituents of the type which do not cause harmful side reactions under the mixing conditions or reaction conditions, for example alkyl or aryl substituents, ether groups and the like. These compounds are preferably glycidyl ethers which are derived from polyhydric phenols, particularly bisphenols, or novolaks and whose epoxy equivalent weights are between 160 and 500, in particular between 160 and 200.

Examples of polyhydric phenols are the following: resorcinol, hydroquinone, 2,2-bis(4-hydroxyphenyl)-propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, 1,1-bis(4-hydroxyphenyl)ethane, 1,1-bis(4-hydroxyphenyl)isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulfone and so on, and also the chlorinated and brominated products of the abovementioned compounds. Particular preference is given to liquid diglycidyl ethers based on bisphenol A, with an epoxy equivalent weight of 180 to 190.

It is also possible to use polyglycidyl ethers of polyalcohols such as for example 1,2-ethanediol diglycidyl ether, butanediol diglycidyl ether, neopentyl glycol diglycidyl ether, hexanediol diglycidyl ether, polypropylene glycol diglycidyl ethers, polyethylene glycol diglycidyl ethers, mixed poly(ethylene-propylene)-glycol diglycidyl ethers, and glycidyl ethers of glycerol, of trimethylolpropane and of pentaerythritol.

In particular cases, it is possible to use, in addition to the polyglycidyl ethers, small amounts of reactive diluents such as for example butyl glycidyl ether, ethylhexyl glycidyl ether, long chain aliphatic glycidyl ethers, monoglycidyl ethers of a mixture of higher isomeric alcohols, phenyl glycidyl ether, cresyl glycidyl ether and p-tert-butylphenyl glycidyl ether, in amounts of up to 30%, preferably 10–20%, relative to the polyglycidyl ether.

Furthermore, it is also possible to use polyglycidyl esters of polycarboxylic acids, which are obtained by reacting epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

A comprehensive list of the suitable epoxy compounds can be found in the publication "Epoxidverbindungen und Epoxidharze" by A. M. Paquin, published by Springer Verlag, Berlin (1958), Chapter IV and in Lee Neville "Handbook of Epoxy Resins", 1967, Chapter 2. See also EP-A-272,595 and EP-A-286,933.

It is also possible to use mixtures of a plurality of epoxy resins.

Another group of polyepoxy compounds for which the curing agents (A) are usable are the epoxy-containing acrylic resins which are prepared in a manner known per se using epoxy-containing monomers.

Instead of the polyepoxy compounds it is also possible to use products of their reaction with $CO_2$ as component (B). These products contain 1,3-dioxolan-2-one groups (cyclic carbonate groups), which can be reacted with primary amines with the formation of urethanes. Depending on the mole ratios of polyepoxy compound and $CO_2$, the reaction with $CO_2$ produces compounds which no longer contain epoxy groups or compounds which contain epoxy groups and cyclic carbonate groups. Cyclic carbonate groups of this type can be introduced into the polymer chain, optionally via appropriate monomers; for this purpose, see DE-A-3,644,372 and DE-A-3,644,373.

The polyepoxy compounds or the cyclic carbonate compounds can, as such, be brought into reaction with the curing agents (A); however, it is often advantageous to react part of the reactive epoxy groups/cyclic carbonate groups with a modifying material so that the film properties are further improved. Particular preference is given to the reaction of the epoxy groups/cyclic carbonate groups with a polyol or a polycarboxylic acid. For instance, it is possible to use epoxy-containing reaction products of low-viscosity polyglycidyl ethers of polyalcohols and polyphenols, preferably liquid glycidyl ethers based on bisphenol A having an epoxy equivalent of 180 to 190 with for example dimeric fatty acids, polyglycoldicarboxylic acids, carboxyl group-containing oligomers of poly(acrylonitrile-butadiene) (hycar types), carboxy-functional polyether oligomers and carboxy-functional acryloyl oligomers.

The molecular weight (weight average) of component (B), determined by gel chromatography (polystyrene standard), is normally in the range of about 300 to about 50000, preferably about 300 to about 20000, and the epoxy equivalent weights between 150 and 25000, preferably 150 and 10000.

Component (B) and curing agent (A) are generally mixed in ratios such that the ratio of equivalences of active NH-groups in (A) to epoxy and/or cyclic carbonate groups in (B) is 0.8 to 1.5, preferably 0.9 to 1.1. For the most part, the amount of (A) used is 5 to 95% by weight, preferably 20 to 70% by weight, relative to the sum of (A) and (B). As a rule, an adequate crosslinked density is obtained in this way.

Other components present in these curable mixtures are optionally also diluents (C), generally in amounts of 1 to 40, preferably 5 to 20% by weight, relative to component (A). The total solids content of systems of this type containing (C) and optionally also (D) is generally between about 20 and 80% by weight, preferably between 30 and 60% by weight. Examples of (C) are: water and also organic solvents such as ethylene glycol monoethers and diethers, propylene glycol monoethers and diethers, and butylene glycol monoethers and diethers of monoalcohols having a branched or unbranched alkyl radical of 1 to 6 carbon atoms, tetrahydrofuran, aliphatic alcohols having branched or unbranched alkyl radicals of 1 to 12 carbon atoms, such as methanol, ethanol, propanol, butanol, araliphatic or cycloaliphatic alcohols such as benzyl alcohol or cyclohexanol, (cyclo)-aliphatic or aromatic hydrocarbons such as hexane, heptane, cyclohexane, toluene, xylenes, Solvesso ® or ketones such as acetone, methyl isobutyl ketone and cyclohexanone. The boiling point of these solvents is preferably not above 210° C. It is also possible to use mixtures of the different diluents.

If water is used as the diluent (C), the proportion of organic solvent can be 0.01 to 20, preferably 0.5 to 10% by weight, relative to the sum of component (A) and water.

Hydroxyl-containing solvents such as benzyl alcohol, hydroxylbenzyl alcohol, 1-phenylethanol, 2-phenoxyethanol, furfuryl alcohol, pine oil, and alcohols having 2 to 18 carbon atoms such as n-butanol, ethylhexyl alcohol, ethyl glycol, methyl glycol, methoxypropanol, and ethoxypropanol generally act as accelerators for the curing reaction.

Examples of other additives in the sense of (D) which may be present in the combination according to the invention, are accelerators and curing catalysts, other curing agents and additional curable resins or extender resins and also the customary paint additives such as pigments, pigment pastes, antioxidants, flow promoters and thickeners (thixotropic agents), antifoams and/or wetting agents, reactive diluents, flame retardants and the like. If desired, these additives may be introduced to the curable mixtures only immediately before processing.

Apart from the abovementioned hydroxyl-containing solvents, examples of other accelerators or curing catalysts which can be used are phenols and alkylphenols having 1-12 carbon atoms in the alkyl group such as cresol, the various xylenols, nonylphenol, polyphenols such as bisphenol A and F, OH-containing aromatic carboxylic acids such as salicylic acid, benzoic acid, p-hydroxybenzoic acid and also tertiary amines such as dimethylaminobenzylamine, 1,3,5-tris(dimethylamino)-phenol and the like.

Suitable additional curing agents are the customary epoxy resin curing agents such as basic curing agents (amine curing agents), for example polyamines, Mannich bases and adducts of polyamines (in excess) to polymers such as polyepoxides; and also phenol-modified amine curing agents and customary polyamidoamines or polyimidazolines which are prepared by condensation of monobasic fatty acids and/or polymeric fatty acids obtained by catalytic polymerization of mono- or polyunsaturated fatty acids or by copolymerization of polymerizable compounds such as for example styrene. Examples of other conventional curing agents can be found in EP-A-272,595.

Examples of additionally curable resins in the sense of component (D) are hydrocarbon resins, phenoxy resins, phenolic resins, polyurethane resins, polysulfides (thiocols), reactive liquid polymers of butadiene and the corresponding acrylonitrile-butadiene copolymers (hycar types), while examples of customary extender resins are, among others, non-reactive epoxy resin modifiers, tars, phthalic esters and coumarone oils.

Examples of suitable fillers are quartz flour, silicates, chalk, gypsum, barium sulfate, titanium dioxide, carbon black, metal powders, organic and inorganic fibers and the like.

Preparation of the curable mixtures according to the invention is carried out by mixing the components (A) and (B) and optionally also (C) and (D). Components of low viscosity can be mixed in bulk, if required being heated to elevated temperatures. Products of higher viscosity are dissolved or dispersed in the abovementioned diluents before being mixed.

The curable mixtures according to the invention can be used in many different ways, for example as a component of paints for coating a great variety of organic and inorganic substrates such as metals, concrete, fibrated concrete, glass, ceramic, rubber, leather, wood, textiles and plastics, and also for preparing thick-layered floor coatings and intermediate coatings. The mixtures according to the invention are particularly suitable for coatings, adhesives, putties, sealing compositions and moldings in a great many fields of application where good adhesion, high impact strength and high shock resistance and improved flexibility and elasticity are required, such as for example in the construction industry for crack-bridging coatings and caulking materials and also as an additive to synthetic cements.

The mixtures can be applied by the usual methods such as brush coating, spray coating, knife coating, dip coating, casting, roller coating and the like. The coatings are then usually cured at room temperature or optionally at elevated temperatures.

The following examples explain the invention.

EXAMPLES

I. Preparation of the polyamidoamine curing component (A)

(1) 1234 g (1.92 moles) of polyglycoldicarboxylic acid (about 10–12 units of —O—$CH_2$—$CH_2$—; acid number: about 174) were charged into a four-necked flask fitted with a stirrer, thermometer and distillation apparatus under an atmosphere of nitrogen and 595 g (4.37 moles) of m-xylylenediamine were added. This resulted in an increase in temperature to about 80° C., due to an exotherm. The mixture is heated further in the course of 30 minutes to 150° C. and kept at 150° C. for 1 hour, during which water began to distil. The mixture was then heated to 170° C. in the course of 2 hours and kept at this temperature for 6 hours. The reaction product had an acid number of <1 mg of KOH/g, an amine number of 146 mg of KOH/g and a viscosity (measured in the Ubbelohde viscometer) of 2900 mPa.s (25° C.). The hydrogen equivalent weight (=HEW) was 177.

(2) 900 g of polyamidoamine curing agent according to Example 1 were stirred together with 100 g of curing agent C (cf. comparative experiments). The HEW of the mixture was 178.

(3) 1186 g (1.89 moles) of polyglycoldicarboxylic acid (about 10–12 units of —O—$CH_2$—$CH_2$—; acid number: about 174) were reacted with 514 g (3.78 moles) of m-xylylenediamine according to Example (1). The reaction product had an acid number of <1 mg of KOH/g, an amine number of 122 mg of KOH/g and a viscosity of 4400 mPa.s (25° C.). The HEW was 216.

(4) 950 g of polyamidoamine curing agent according to Example 3 were stirred together with 50 g of "accelerator 399" (Texaco; combination of piperazine/alkanolamine). The mixture had a viscosity of 3400 mPa.s (25° C.) and an HEW of 227.

(5) 1971 g (8.21 moles) of 3,6,9-trioxaundecanedicarboxylic acid (acid number: about 467) were reacted with 1429 g (12.32 moles) of 2-methylpentanediamine according to Example (1). The reaction product had an acid number of 2.5 mg of KOH/g, an amine number of 144 mg of KOH/g and a viscosity of 72800 mPa.s (25° C.). The HEW was 189.

(6) 950 g of polyamidoamine curing agent according to Example 5 were stirred together with 50 g of accelerator 399 (Texaco). The mixture had a viscosity of 52400 mPa.s (25° C.). The HEW was 199.

(7) 2204 g (3.41 moles) of polyglycoldicarboxylic acid (about 10-12 —O—$CH_2$—$CH_2$— units; acid number: about 174) were reacted with 1196 g (7.02 moles) of isophoronediamine according to Example (1). The reaction product had an acid number of 1.8 mg of KOH/g, an amine number of 114 mg of KOH/g and a viscosity of 7370 mPa.s (25° C.). The HEW was 233.

(8) 950 g of polyamide curing agent according to Example 7 were stirred together with 50 g of accelerator 399 (Texaco). The mixture had a viscosity of 6400 mPa.s (25° C.) and an HEW of 245.

(9) 1978 g (3.07 moles) of polyglycoldicarboxylic acid (about 10-12 —O—$CH_2$—$CH_2$— units; acid number: about 174) were reacted with 1023 g (7.0 moles) of triethylenetetramine according to Example (1). The reaction product had an acid number of 1.8 mg of KOH/g, an amine number of 374 mg of KOH/g and a viscosity of 2800 mPa.s (25° C.) The HEW was 96.

(10) 2646 g (4.10 moles) of polyglycoldicarboxylic acid (about 10-12 —O—$CH_2$—$CH_2$— units; acid number: about 174) were reacted with 954 g (8.22 moles) of 2-methylpentanediamine according to Example (1). The reaction product had an acid number of 2.0 mg of KOH/g, an amine number of 123 mg of KOH/g and a viscosity of 1897 mPa.s (25° C.). The HEW was 210.

(11) 1506 g of the polyaminoamide from Example 1) were heated to 40° C. and 195 g of a liquid epoxy resin based on bisphenol A with an epoxy equivalent of 182 were added. The temperature increased over a period of 30 minutes to 110° C. After the exotherm had subsided, the mixture was kept at 100° C. for a further 3 hours. The reaction product had a viscosity of 28940 mPa.s (25° C.), an amine number of 134 mg of KOH/g and an HEW of 228. The viscosity, measured on an 80% strength solution in water, was 1680 mPa.s (25° C.) and, measured on an 80% strength solution in methoxypropanol, was 1250 mPa.s (25° C.).

II. Comparative experiments A to F (prior art curing agent)

The comparative curing agents had the following properties:

| Label | Type | HEW | Viscosity 25° C. mPa.s | Pot life with 100 g of bisphenol A epoxy resin (EV 183) in h |
|---|---|---|---|---|
| A | m-xylylenediamine | 34 | 7 | 1.9 |
| B | modified polyamine (epoxy resin adduct)[1] | 113 | 4000 | 0.6 |
| C | modified aliphat. polyamine[2] | 190 | 6000 | 0.15 |
| D | polyamidoamine[3] | 105 | 30000 | 2 |
| E | polyamidoamine[4] | 100 | 10000 | 2.5 |
| F | polyamidoamine[5] | 100 | 1000 | 1 |

[1]Beckopox ® special curing agent VEH 2621
[2]Beckopox ® special curing agent EH 611
[3]Beckopox ® special curing agent EH 652
[4]Beckopox ® special curing agent EH 654
[5]Beckopox ® special curing agent EH 655

III. Examples of flexible encapsulation compositions 70 g in each case of a liquid bisphenol-based epoxy resin with an epoxy equivalent of 183 were mixed with an amount corresponding to the HEW of the curing agent from Examples 1 to 11, poured into cylindrical metal molds 10 mm in height and 75 mm in diameter and cured for 24 hours at 50° C. or 7 days at room temperature. Similarly, 100 g of the epoxy resin were mixed with an amount corresponding to the HEW of the comparative curing agent and cured. The resulting moldings were subjected to the impact test in accordance with ASTM D 2794 in 20 inch-pound (ip) steps at room temperature and, in the case of impact energies of above 160 ip, additionally after storage for at least 24 hours at −28° C. (tested immediately after withdrawal from the freezer), and an assessment was also made of the surface and of the elastic behavior (manually). The results of this test are compiled in Table 1.

TABLE 1

| Curing agent Example | Moldings cured for 24 h at 50° C. | | | Moldings cured for 7 d at RT | | |
|---|---|---|---|---|---|---|
| | Properties | ip RT* | ip −28° C. | Properties | ip RT | ip −28° C. |
| (1) | very tough & resilient | >160 | >160 | very tough & resilient | >160 | >160 |
| (2) | very tough & resilient | >160 | >160 | very tough & resilient | >160 | >160 |
| (3) | very tough & resilient | >160 | >160 | tough & resilient | >160 | >160 |
| (4) | very tough & resilient | >160 | >160 | tough & resilient | >160 | >160 |
| (5) | hard & flexible | >160 | 140 | hard & flexible | >160 | 60 |
| (6) | hard & flexible | >160 | >160 | hard & flexible | >160 | >160 |
| (7) | very tough & resilient | >160 | >160 | very tough & resilient | >160 | 60 |
| (8) | very tough & resilient | >160 | >160 | very tough & resilient | >160 | 80 |
| (9) | hard & flexible | >160 | >160 | hard & flexible | >160 | >160 |
| (10) | very tough & resilient | >160 | >160 | very tough & resilient | >160 | >160 |
| (11) | very tough & resilient | >160 | >160 | very tough & resilient | >160 | >160 |
| A (comparison) | hard | 60 | | hard | 20 | |
| B (comparison) | hard | 100 | | hard | 60 | |
| C (comparison) | hard | >160 | | hard | >160 | 100 |
| D (comparison) | hard | 60 | | hard | 60 | |
| E (comparsion) | hard | 100 | | hard | 40 | |
| F (comparison) | hard | >160 | >160 | hard | 40 | |

*RT = Room temperature

IV. Examples of elastified coating compositions 100 g in each case of a liquid epoxy resin based on bisphenol A with an epoxy equivalent of 182 were mixed with an amount corresponding to the HEW of the curing agents from Examples (1), (5), (6), (7), (8) and (11) according to the invention and from Comparative Examples B and F, and a 2 mm thick layer was applied to a concrete slab having a surface area of 8 × 16 cm.

After 14 days' curing time at ambient temperature, a 1 mm wide crack was made at a preselected location by breaking the concrete slab. The cured layer applied to the concrete was assessed for its crack-bridging characteristics (cf. Table 2).

this way, sheets 4 mm in thickness were obtained which were aged after demolding for a further 2 hours at 100° C. These sheets were used to prepare the corresponding test specimens for the tests given in Table 4.

TABLE 2

| Curing agent Example | g of curing agent per 100 g of epoxy resin | Characteristics of the coating | |
|---|---|---|---|
| (1) | 97.4 | no crack in the coating | tack free surface |
| (5) | 104.0 | " | " |
| (6) | 109.5 | " | " |
| (7) | 128.2 | " | " |
| (8) | 134.8 | " | " |
| (11) | 124.6 | " | " |
| B (comparison) | 62.2 | coating cracked | " |
| F (comparison) | 55.0 | " | very tacky surface |

V. Examples of flexible adhesive systems

A liquid epoxy resin based on bisphenol A having an epoxy equivalent of 182 was stirred together with each of the curing agents or curing agent mixtures in the amounts given in Table 3 and cast into films or used for aluminum/aluminum bonded joints.

Testing for ultimate tensile strength and elongation at break

The cast films, 1–2 mm in layer thickness, (curing time 3 days; room temperature) were stamped out into test pieces and the ultimate tensile strength and elongation at break determined in accordance with DIN 43455.

Testing of the shear strength

Aluminum test strips about 10 cm in length and 2.5 cm in width were pretreated by pickling and bonded to a surface 2.5 × 1.0 cm in dimensions. Curing was carried out for 24 hours at room temperature and then for 30 minutes at 120° C. After a further 24 hours storage at room temperature, the shear strength was determined in accordance with DIN 53283.

The results of the tests are compiled in Table 3.

TABLE 3

| | Comparison 53 | 94 | 115 | 120 | 124 | 130 | 100 | 106 |
|---|---|---|---|---|---|---|---|---|
| | Parts by weight of curing agent per 100 g of epoxy resin according to Example: | | | | | | | |
| | F | (1) | (3) | (4) | (7) | (8) | (5) | (6) |
| Gel time | 2 h 40' | 4 h 45' | 5 h 20' | 2 h 25' | 7 h 40' | 4 h 15' | 3 h 10' | 1 h 10' |
| Shear strength (N/mm$^2$) | 14.8 | 8.8 | 7.1 | 7.5 | 9.0 | 10.5 | 6.2 | 4.2 |
| Ultimate tensile strength (N/mm$^2$) | 55 | 20.5 | 13.0 | 11.4 | 20.5 | 22.3 | 16.9 | 22.9 |
| Elongation at break % | 5 | 104 | 98 | 106 | 93 | 105 | 130 | 109 |

The results of Table 1 demonstrate the higher impact strength and shock resistance and the more favorable low temperature characteristics of the moldings producible according to the invention in comparison with those of the comparative examples. Table 2 gives examples of the excellent crack-bridging properties and Table 3 gives examples of adhesives with high elasticity in the products obtainable according to the invention in comparison with prior art products.

VI. Examples of flexible moldings

A liquid epoxy resin based on bisphenol A having an epoxy equivalent of about 180 was stirred together with each of the curing agents or curing agent mixtures in the amounts given in Table 4 and poured into a mold. Curing was carried out for 72 hours at room temperature. In

TABLE 4

| | | | |
|---|---|---|---|
| Epoxy resin ®) Beckopox EP 116 | 100 | 100 | 100 |
| Comparative curing agent B | 62.2 | | |
| Curing agent according to Example 1 | | 97.4 | |
| Curing agent according to Example 8 | | | 134.8 |
| Elongation at max. tensile strength in accordance with DIN 53 455% | 2.3 | 73.8 | 78.0 |
| Flexurals (E.I) N. cm$^2$ in accordance with DIN 53 864 | 62.4 | 2.8 | 14.7 |

We claim:

1. A curable mixture containing a polyamidoamine (A) which has primary and/or secondary amino groups and which has been obtained by polycondensation of (a) a compound of the formula $$R^2OOC-CH_2-[-O-R^1-]_nO-CH_2-COOR^2 \qquad (I)$$

in which

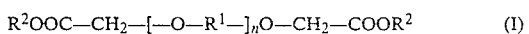

$R^1$ = an alkylene radical having 2 to 5 carbon atoms;
$R^2$ = independently of one another, hydrogen or an alkyl radical having 1 to 6 carbon atoms;
n = 0 or an integer from 1 to 300 with (b) a polyamine which contains at least two amino groups which are condensable with (a) an epoxy group-containing compound (B), optionally a diluent (C) and optionally an additive (D).

2. A curable mixture as claimed in claim 1, wherein the polyamidoamine (A) has an amine number from 50 to 500 mg of KOH/g and an equivalent weight of active hydrogen of 50 to 500.

3. A curable mixture as claimed in claim 1, wherein the polyamidoamine (A) has an average molecular weight $M_n$ of from 200 to 2500.

4. A curable mixture as claimed in claim 1, wherein $R^1$ in formula (I) is an ethylene radical and n is 1 to 50.

5. A curable mixture as claimed in claim 1, wherein the polyamine (b) has the formula (II)

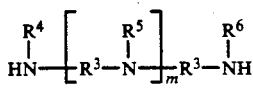

in which $R^3$ = independently of one another, a divalent hydrocarbon radical having 1 to 20 carbon atoms, an alkylene radical having 1 to 20 carbon atoms, a cycloalkylene radical having 5 to 12 carbon atoms or an aralkylene radical having 7 to 12 carbon atoms;

$R^4$, $R^5$, $R^6$ = independently of one another, hydrogen, a hydrocarbon radical having 1 to 20 carbon atoms, an alkyl radical having 1 to 20 carbon atoms, a cycloalkylene radical having 5 to 12 carbon atoms or an aralkylene radical having 7 to 12 carbon atoms, where these radicals may also be interrupted by heteroatoms or $R^4$ and $R^5$ = part of a ring system having 3 to 8 carbon atoms;

m = 0 or an integer from 1 to 8.

6. A curable mixture as claimed in claim 1, wherein the compound (a) used is one from the group consisting of 3,6-dioxaoctanedicarboxylic acid, 3,6,9-trioxaundecanedicarboxylic acid and polyglycoldicarboxylic acid having a molecular weight of from 400 to 600 and the polyamine (b) used is one from the group consisting of 2-methylpentanediamine, diethylenetriamine, triethylenetetramine, isophoronediamine, m-xylylenediamine and trimethylhexamethylenediamine.

7. A curable mixture as claimed in claim 1, wherein the polyamidoamine (A) is pre-crosslinked with an epoxy-containing compound.

8. A curable mixture as claimed in claim 7, wherein 0.1 to 50% of the active hydrogen of the polyamidoamine (A) is pre-crosslinked with the epoxy-containing compound.

9. A curable mixture as claimed in claim 1, wherein the amount of polyamidoamine (A) is 5 to 95% by weight, relative to the sum of (A) and (B).

10. A curable mixture as claimed in claim 1, wherein the epoxy equivalent weight of the epoxy-containing compound (B) is between 150 and 10000.

11. A curable mixture as claimed in claim 1, wherein the epoxy-containing compound (B) contains, on average, two epoxy groups per molecule.

12. A curable mixture as claimed in claim 1, wherein the diluent (C) is water or a mixture of water and an organic solvent.

13. A process for the curing of an epoxy-containing compound (B), which comprises using as the curing agent a polyamidoamine (A) having primary and/or secondary amino groups and which has been obtain by polycondensation of (a) a compound of the formula $$R^2OOC-CH_2-[-O-R^1-]_nO-CH_2-COOR^2 \quad (I)$$

in which $R^1$ = an alkylene radical having 2 to 5 carbon atoms;

$R^2$ = independently of one another, hydrogen or an alkyl radical having 1 to 6 carbon atoms;

n = 0 or an integer from 1 to 300 with (b) a polyamine containing at least two amino groups which are condensable with (a).

14. The process as claimed in claim 13, wherein the polyamidoamine (A) has an amine number from 50 to 500 mg of KOH/g and an equivalent weight of active hydrogen of 50 to 500.

15. The process as claimed in claim 13, wherein the polyamidoamine (A) has an average molecular weight $M_n$ of from 200 to 2500.

16. The process as claimed in claim 13, wherein the compound (a) used is one from the group consisting of 3,6-dioxaoctanedicarboxylic acid, 3,6,9-trioxaundecanedicarboxylic acid and polyglycoldicarboxylic acid having a molecular weight of from 400 to 600 and the polyamine (b) used is one from the group consisting of 2-methylpentanediamine, diethylenetriamine, triethylenetetramine, isophoronediamine, m-xylylenediamine and trimethylhexamethylenediamine.

17. The process as claimed in claim 13, wherein the amount of polyamidoamine (A) is 5 to 95% by weight, relative to the sum of (A) and (B).

18. The process as claimed in claim 13, wherein the epoxy equivalent weight of the epoxy-containing compound (B) is between 150 and 10000.

* * * * *